US006692543B1

United States Patent
Hamano et al.

(10) Patent No.: US 6,692,543 B1
(45) Date of Patent: *Feb. 17, 2004

(54) METHOD FOR MANUFACTURING LITHIUM ION SECONDARY BATTERY (75) Inventors: Kouji Hamano, Tokyo (JP); Yasuhiro Yoshida, Tokyo (JP); Michio Murai, Tokyo (JP); Takayuki Inuzuka, Tokyo (JP); Hisashi Shiota, Tokyo (JP); Jun Aragane, Tokyo (JP); Hiroaki Urushibata, Tokyo (JP); Shigeru Aihara, Tokyo (JP); Daigo Takemura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/581,813
(22) PCT Filed: Dec. 18, 1997
(86) PCT No.: PCT/JP97/04666
§ 371 (c)(1), (2), (4) Date: Jul. 27, 2000
(87) PCT Pub. No.: WO99/31749
PCT Pub. Date: Jun. 24, 1999
(51) Int. Cl.[7] .......................... H01M 2/14; H01M 10/38
(52) U.S. Cl. ..................... 29/623.4; 29/623.5; 429/144; 429/249; 429/306
(58) Field of Search .................... 29/623.5, 623.4; 429/144, 145, 249, 254, 306

(56) References Cited

U.S. PATENT DOCUMENTS

| 4,524,509 | A | | 6/1985 | Wegner | |
|---|---|---|---|---|---|
| 5,300,206 | A | * | 4/1994 | Allen et al. | 156/306.6 |
| 5,437,692 | A | | 8/1995 | Dasgupta et al. | |
| 5,508,129 | A | * | 4/1996 | Barker | 429/50 |
| 5,625,475 | A | * | 4/1997 | Tanioka et al. | 349/123 |
| 5,637,421 | A | * | 6/1997 | Poehler et al. | 429/303 |
| 5,681,357 | A | | 10/1997 | Eschbach et al. | |
| 5,923,925 | A | * | 7/1999 | Nakamura et al. | 399/116 |
| 5,981,107 | A | | 11/1999 | Hamano et al. | 429/231.95 |
| 6,024,773 | A | | 2/2000 | Inuzuka et al. | 29/623.4 |
| 6,051,342 | A | | 4/2000 | Hamano et al. | 429/303 |
| 6,124,061 | A | | 9/2000 | Hamano et al. | 429/316 |
| 6,136,471 | A | | 10/2000 | Yoshida et al. | 429/218.1 |
| 6,180,281 | B1 | * | 1/2001 | Schneider et al. | 429/129 |
| 6,225,010 | B1 | | 5/2001 | Hamano et al. | 429/306 |
| 6,231,626 | B1 | | 5/2001 | Yoshida et al. | 29/623.5 |
| 6,232,014 | B1 | | 5/2001 | Shiota et al. | 429/164 |
| 6,235,066 | B1 | | 5/2001 | Inuzuka et al. | 29/623.5 |
| 6,270,928 | B1 | * | 8/2001 | Andrieu et al. | 429/249 |
| 6,291,102 | B1 | | 9/2001 | Yoshida et al. | 429/231.95 |
| 6,306,540 | B1 | | 10/2001 | Hiroi et al. | 429/199 |
| 6,322,599 | B1 | | 11/2001 | Hamano et al. | 29/623.5 |

FOREIGN PATENT DOCUMENTS

| EP | 0 892 454 | | 1/1999 |
|---|---|---|---|
| JP | 58-120680 | * | 7/1983 |
| JP | 5-6775 | * | 1/1993 |
| JP | 9-293516 | | 11/1997 |
| JP | 9-293518 | * | 11/1997 |
| WO | WO 96/20504 | | 7/1996 |

* cited by examiner

*Primary Examiner*—Randy Gulakowski
*Assistant Examiner*—Jonathan Crepeau
(74) *Attorney, Agent, or Firm*—Oblon, Spivak, McClelland, Maier & Neustadt, P.C.

(57) ABSTRACT

A method for manufacturing a lithium ion secondary battery comprising preparing a positive electrode (3) where a positive electrode active material (7) is joined with a positive electrode collector (6), a negative electrode (5) where a negative electrode active material (9) is joined with a negative electrode collector (10), and a separator (4) for retaining the electrolytes including lithium ions, being arranged between the positive electrode (3) and the negative electrode (5), the process of supplying adhesive solution applied on the separator with a second solvent different from a first solvent after applying the adhesive resin solution, where adhesive resin (11) is dissolved in the above first solvent, to the separator (4), and the process of forming an electrode laminate by sticking the positive electrode (3) and the negative electrode (5) to the separator (4).

17 Claims, 9 Drawing Sheets

METHOD FOR MANUFACTURING LITHIUM ION SECONDARY BATTERY

TECHNICAL FIELD

The present invention relates to a method for manufacturing a lithium ion secondary battery comprising a separator containing electrolyte, a positive electrode and a negative electrode facing each other with the separator therebetween. More specifically, the present invention relates to a method for manufacturing a battery which can take optional form such as a flat type and is compatible with adherence and electric connection among a separator, a positive electrode and a negative electrode.

BACKGROUND ART

There is a great demand for miniaturization and weight reduction of portable electric appliances, and their realization requires improvements in battery performance. In recent years, various batteries have been developed and improved for improvements in the battery performance. The expected improvements in the battery performance are higher voltage, higher energy density, higher resistance to load, formability for optional form, safety and the like. A lithium ion secondary battery has been improved enthusiastically even in a recent year, since it has the highest voltage in a single battery in all kinds of batteries present and can realize higher energy density and higher resistance to loads.

A lithium ion secondary battery contains a positive electrode, a negative electrode, and an ion conducting layer sandwiched between these electrodes as a main component. In the practical lithium ion secondary battery, the positive electrode is generally made by mixing an active material powder such as a lithium-cobalt oxide composite with an electronic conductive powder and a resin to bond these powders, and applying the mixture onto an aluminum current collector to form it into a plate. And the negative electrode is generally made by mixing a carbon-based active material powder with a binding resin, and applying the mixture onto a copper current collector to form it into a plate. The ion conducting layer is generally made of a porous film such as polyethylene or polypropylene impregnated with a non-aqueous solution containing lithium ions.

Figure 9:
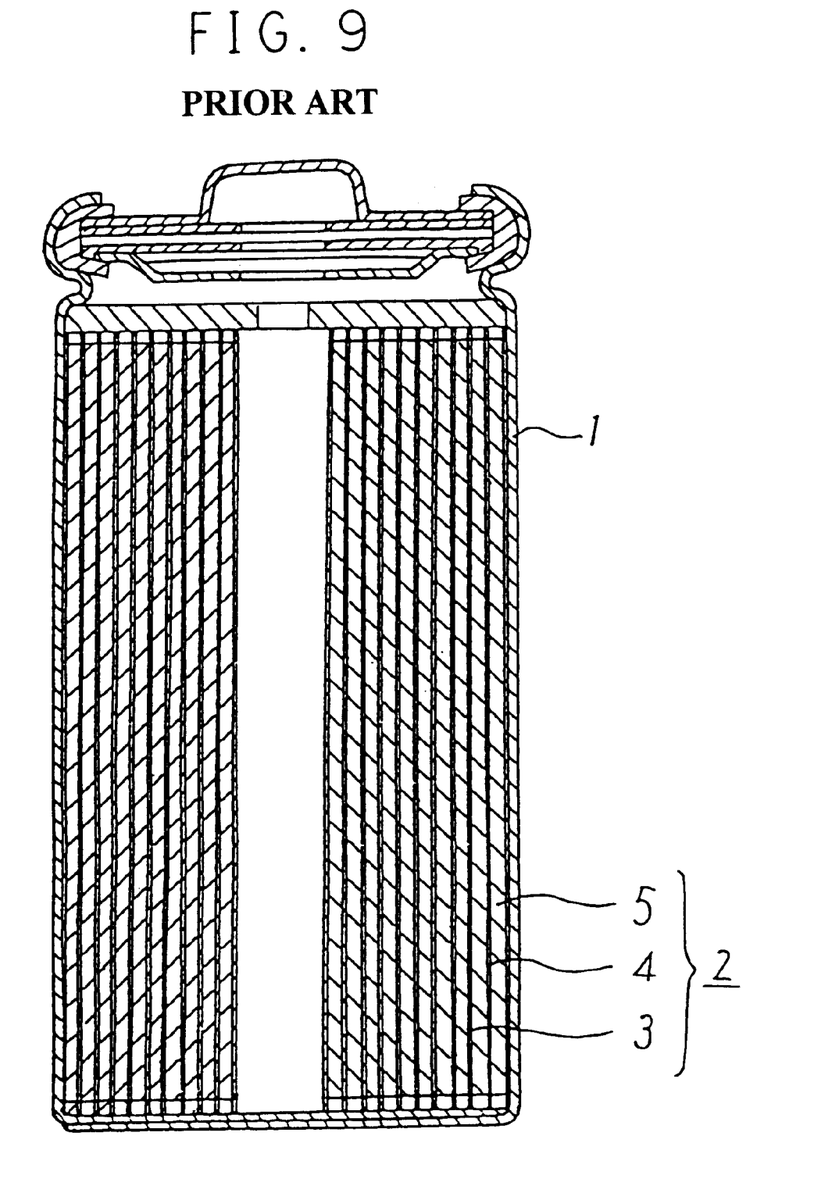
FIG. 9 is an illustration showing a conventional lithium ion secondary battery.

For example, FIG. 9 shows a cross sectional view of the structure of a conventional cylindrical lithium ion secondary battery disclosed in Japanese Unexamined Patent Publication No. 83608/1996. In FIG. 9, 1 is a solid casing made of stainless or the like which also serves as a negative electrode terminal, and 2 is an electrode assembly stored in the solid casing 1. The electrode assembly 2 comprises a positive electrode 3, a separator 4, and a negative electrode 5, which are coiled together. The electrode assembly 2 must give pressure from outside to its electric surface in order to maintain the electric connection among the positive electrode 3, the separator 4 and the negative electrode 5. To maintain all the contacts inside the surface, the electrode assembly 2 is stored in a strong metal casing. In the case of a square-shaped battery, strip-like electrode assemblies tied in a bundle are stored in a square-shaped casing and pressed with an external pressure.

As described above, in a commercially available lithium ion secondary battery, a strong solid casing made of a metal or the like is used as a means to adhere the positive electrode to the negative electrode. Without the solid casing, a distance between the electrode surfaces becomes far each other, failing to maintain the electric connection between the electrodes via the ion conducting layer (a separator impregnated with a non-aqueous electrolyte), thereby deteriorating the battery properties. Since a volume and a weight of the solid casing is large in the whole battery, it decreases energy density in a battery unit volume or a unit weight, and also limits the possible form of the battery due to the stiffness of the solid casing. Thus, it is difficult to obtain a desired form.

Under those circumstances, in order to realize a reduction in weight and thickness, a lithium ion secondary battery which does not need a strong solid casing have been developed. The key point to the development of the battery which does not require a strong solid casing is to successfully maintain the electric connection between the positive electrode, the negative electrode and the ion conducting layer sandwiched therebetween without applying an external pressure. One proposed method of joining the electrodes with the ion conducting layer without external force is to use a resin or the like.

For example, Japanese Unexamined Patent Publication No. 159802/1993 discloses a method for combining an ion conductive solid electrolyte layer, a positive electrode, and a negative electrode by heating using a thermoplastic resin binder. According to the method, these electrodes are joined with each other by uniting the positive electrode, the negative electrode and the solid electrolyte layer, so that the electric connection between these electrodes and the solid electrolyte is maintained without applying any external pressure, which makes it possible to function as a battery.

The conventional lithium ion secondary battery using a strong solid casing to secure adherence and electric connection between the positive and negative electrodes and the separator has a drawback that the solid casing, which is not included in the electric generator, makes up a large proportion of the entire battery in weight and volume, becoming a disadvantage to manufacture a high energy density battery. It seems possible to use an ion conducting adhesive resin to adhere a positive electrode, a negative electrode and the separator, but there arises a problem that when the positive and negative electrodes are simply adhered to the solid electrolyte (corresponding to a separator impregnated with an electrolyte) via an adhesive resin, too large resistance of the ion conductive adhesive resin layer causes the ion conductive resistance between the electrodes to increase, thereby deteriorating the battery properties.

In the example disclosed in Japanese Unexamined Patent Publication No. 159802/1993 wherein the positive and negative electrodes are joined with the solid electrolyte via a bonding agent, the interface among the positive and negative electrodes and the solid electrolyte is covered with the bonding agent, so that the battery is inferior to a battery with a liquid electrolyte in terms of conductivity and battery performance due to increased resistance between the electrodes. Even if a bonding agent having ion conductivity is used, it is still difficult to obtain the same level of battery performance as the liquid electrolyte.

The present invention, which has contrived as a result of hard study on the preferable method of adhering to the separator and the positive and negative electrodes to solve the above-mentioned problems, has an object of providing a method for manufacturing a rechargeable lithium ion secondary battery capable of adhering a positive and negative electrodes and a separator without a strong solid casing or without increasing resistance between the electrodes, and of having high energy density, being thinner, and being any desired form.

DISCLOSURE OF INVENTION

The first method for manufacturing a lithium ion secondary battery of the present invention comprises the following steps; a step of preparing a positive electrode obtained by joining a positive electrode active material layer with a positive electrode current collector, a negative electrode obtained by joining a negative electrode active material layer with a negative electrode current collector, and a separator arranged between the positive electrode and the negative electrode, a step of supplying a second solvent different from the first solvent to the applied adhesive resin solution after applying an adhesive resin solution, wherein an adhesive resin is dissolved in a first solvent, to the separator, and a step of forming an electrode laminate by laminating the positive electrode and the negative electrode to the separator.

By this method it is possible to join the active material layer with the separator without using a solid casing. In addition, when a porous adhesive resin is formed to electrically connect the active material layer and the separator with the use of an electrolyte, the second solvent different from the first solvent used for the adhesive resin solution applied on the separator is supplied to the applied adhesive resin solution, which realizes a decrease in the fluidity in the vicinity of the surface of the applied adhesive resin solution. As a result, it becomes possible to restrict penetration of the adhesive resin solution into the battery and to improve the adhesion, thereby forming a porous adhesive resin layer having improved bonding strength between the electrodes and the separator via the adhesive resin. And it provides an effect of obtaining a lithium ion secondary battery which has excellent charge-discharge properties and high energy density and can be formed into any desirable shape in a simple manner with good workability.

The second method for manufacturing a lithium ion secondary battery of the present invention is that in the first method the second solvent is a material soluble in the first solvent and having lower solubility of the adhesive resin than the first solvent. In the method, a material, which can be uniformly mixed in a solvent used for the adhesive resin solution but has a lower solubility of the adhesive resin than the first solvent, is used as the second solvent. It has an effect of decreasing fluidity of the adhesive resin solution as compared with the case wherein only the first solvent is used.

The third method for manufacturing a lithium ion secondary battery of the present invention is that in the first method the second solvent is supplied to the surface of the applied adhesive resin solution by spraying droplets of the second solvent through a spray. In the method, spraying the droplets of the second solvent through a sprayer has an effect of decreasing fluidity of the adhesive resin solution in the vicinity of its surface in a simple manner with good workability.

The fourth method for manufacturing a lithium ion secondary battery of the present invention is that in the first method the second solvent is supplied by introducing the separator applied with the adhesive resin solution to space containing vapor of the second solvent. In the method, fluidity of the adhesive resin solution in the vicinity of its surface can be decreased in a simple manner with good workability by exposing the surface of the applied adhesive resin solution to the vapor of the second solvent.

The fifth method for manufacturing a lithium ion secondary battery of the present invention is that in the first method the adhesive resin is either a fluororesin or a mixture comprising a fluororesin as a main component. In the method, by using either a fluororesin or a mixture mainly comprising a fluororesin as an adhesive resin, it becomes possible to obtain a porous adhesive resin layer having a large bonding strength, and consequently, electrode laminate having low resistance between the electrodes and sufficient bonding between the electrodes and the separator can be obtained. As a result, a lithium ion secondary battery having excellent properties can be obtained.

The sixth method for manufacturing a lithium ion secondary battery of the present invention is that in the fifth method the fluororesin is a homopolymer or a copolymer of vinylidene fluoride. In the method, by using the homopolymer or copolymer of vinylidene fluoride as the fluororesin there arises an effect of obtaining an electrode laminate which is electrochemically very stable, has low resistance between the electrodes and sufficient bonding between the electrodes and the separator.

The seventh method for manufacturing a lithium ion secondary battery of the present invention is that in the first method the adhesive resin is either poly(vinyl alcohol) or a mixture comprising poly(vinyl alcohol) as a main component. In the method, by using either poly(vinyl alcohol) or a mixture mainly comprising poly(vinyl alcohol) as the adhesive resin it becomes possible to obtain an electrode laminate which is electrochemically very stable, has low resistance between the electrodes and sufficient bonding between the electrodes and the separator.

The eighth method for manufacturing a lithium ion secondary battery of the present invention is that the first method further comprises a step of forming a structure wherein a plurality of an electrode laminate are piled up. According to the present invention, the sufficient bonding strength and the high ion conductivity are secured, therefore it can provide a structure wherein a plurality of an electrode laminate are piled up, namely a structure of a laminated electrode battery which does not need a strong solid casing. Thus, by forming a structure of an electrode laminate it becomes possible to obtain a compact lithium ion secondary battery having stable battery properties.

BEST MODE FOR CARRYING OUT THE INVENTION

The present invention is applicable to a battery having a structure comprising a positive electrode, a negative electrode, and a separator arranged between these electrodes. The following embodiments mainly describe a single-layered electrode type battery of single electrode laminate layer mainly comprising a positive electrode, a separator, and a negative electrode, but the present invention can be applied to a multi-layered electrode type battery.

Figure 1:
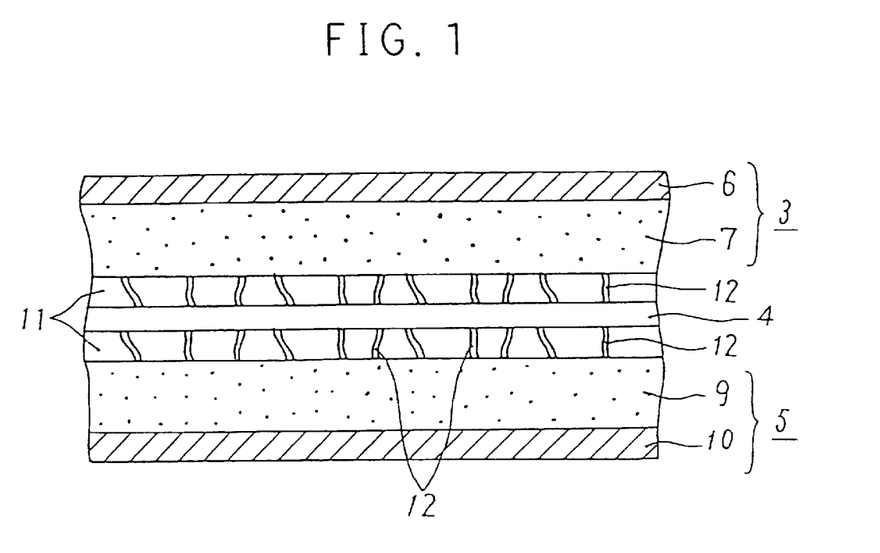
FIG. 1 is a cross sectional view showing the battery structure of the lithium ion secondary battery of an embodiment of the present invention.

FIG. 1 is a schematic cross sectional view showing the battery structure of the lithium ion secondary battery of one embodiment of the present invention, namely the structure of an electrode laminate. In this FIG. 3 is a positive electrode wherein a positive electrode active material layer 7 is joined with a positive electrode current collector 6, 5 is a negative electrode wherein a negative electrode active material layer 9 is joined with a negative electrode current collector 10, 4 is a separator arranged between the positive electrode 3 and the negative electrode 5 and retaining an electrolyte containing lithium ions, 11 is a porous adhesive resin layer which joins the separator 4 with each of the positive electrode active material layer 7 and the negative electrode active material layer 9 and has a number of through holes 12 penetrating the positive electrode active material layer 7, the negative electrode active material layer 9 and the separator 4. Electrolyte is retained in the through holes 12.

Since the active material layers 7, 9 and the separator 4 forming an ion conducting layer are joined with each other via the porous adhesive resin layer 11, it becomes possible to secure the adhesive strength between the electrodes and the separator and to join the electrodes with the separator without using a solid casing. Since the electrolyte is held inside the through holes 12 formed in the adhesive resin layer 11 penetrating the electrodes and the separator, it is possible to secure the excellent ion conductivity at the interface between the electrodes and the electrolyte, and to reduce the ion conductive resistance between the electrodes. In other words, it becomes possible to have the same amount of ions coming in and going out in the active material inside the electrode, the same transferring rate and the same amount of ions towards opposite electrodes as a lithium ion secondary battery using the conventional solid casing. As a result, it becomes possible to manufacture a compact and weight-reduced battery, which can maintain an electric connection between the electrodes without applying an external pressure, and has similar battery properties as a conventional battery using a solid casing.

By making the ion conductive resistance rate of the adhesive resin layer 11 holding an electrolyte equal to or lower than that of the separator 4 holding an electrolyte, the adhesive resin layer 11 does not decrease battery properties including a load ratio property or a charge-discharge property. As a result, it becomes possible to maintain the same level of battery properties as the conventional battery.

The ion conductive resistance ratio of the adhesive resin layer 11 can be adjusted mainly by changing a space rate and a thickness thereof. Concretely, the ion conductive resistance ratio can be controlled by the type of the adhesive resin used to form the adhesive resin layer, a concentration and an application amount of the solution obtained by dissolving an adhesive resin into a solvent. However, it is preferable that the concentration of the solution is as low as possible and the amount of application is as small as possible.

The bonding strength between the positive electrode active material layer 7 and the separator 4 is made the same level as or a higher level than that between the positive electrode active material layer 7 and the positive electrode current collector 6. Furthermore, the bonding strength between the negative electrode active material layer 9 and the separator 4 is made the same level as or a higher level than that between the negative electrode active material layer 9 and the negative electrode current collector 10. Thus, it is preferable that the bonding strength is made to be as large as or larger than the strength of uniting the active material layer and the current collector inside each electrode.

Concretely, after an adhesive resin solution obtained by dissolving an adhesive resin in a first solvent is applied onto the separator 4, a second solvent which does not easily dissolve the adhesive resin is supplied in drops or in vapor to decrease fluidity of the adhesive resin solution in the vicinity of the air interface, and thereby reducing penetration into an inside of the battery with a low solution concentration and also improving an adhesion. Consequently, the bonding strength between the electrodes 3, 5 and the separator 4 can be the same as or higher than the bonding strength between the active material layers 7, 9 and the current collectors 6, 10. The reduction degree of the fluidity of the adhesive resin solution can be controlled by the type of the solvent supplied and a supplying amount per unit time.

The adhesive resin forming the adhesive resin layer 11 is material which is not dissolved in an electrolyte and becomes a porous film without causing an electrochemical reaction inside the battery. Examples thereof are a fluororesin, a mixture containing a fluororesin as a main component, poly(vinyl alcohol), or a mixture containing poly(vinyl alcohol) as a main component. Concrete examples of the fluororesin are a homopolymer or a copolymer having a fluorine atom in its molecular structure such as vinylidene fluoride and ethylene tetrafluoride, a polymer or a copolymer having vinyl alcohol in the molecular structure, or a mixture of poly(methyl methacrylate), polystyrene, polyethylene, polypropylene, poly(vinylidene chloride), poly(vinyl chloride), polyacrylonitrile, or poly(ethylene oxide). Among those, poly(vinylidene fluoride) of a fluororesin is appropriate.

The first solvent dissolving the adhesive resin to form the adhesive resin layer 11 is material having excellent solubility of the adhesive resin. Examples thereof are as N-methyl pyrrolidone, N, N'-dimethylformamide, and dimethyl sulfoxide which make high polarity. From the viewpoint of safety, N-methyl pyrrolidone is preferable.

The second solvent decreasing fluidity of the adhesive resin solution in the vicinity of the air interface, in forming the adhesive resin layer 11, is material having low solubility of the adhesive resin. Example thereof are alcohols such as methanol and ethanol, hydrocarbons such as hexane, pentane and cyclohexane, water and the like. Among those, water is preferable from the viewpoint of safety.

The lithium ion secondary battery having the above-mentioned structure can be manufactured as follows. An adhesive resin solution prepared by dissolving a fluororesin or a mixture mainly comprising a fluororesin into N-methyl pyrrolidone is applied on both sides of the separator 4, the adhesive resin solution, which is applied for a constant time under high humid conditions, is supplied with water to decrease fluidity of the adhesive resin solution. After this, the positive electrode active material layer 7 and the negative electrode active material layer 9 are laminated, and then N-methyl pyrrolidone and water are evaporated to prepare the battery by forming the porous adhesive resin layer 11 which joins the positive electrode active material layer 7, the negative electrode active material layer 9 and the separator 4 together.

The active materials used for the positive electrode 3 in the present invention can be preferably a composite oxide comprising lithium and a transition metal such as cobalt, nickel or manganese, a chalcogen compound, or a material containing these composite oxides or various kinds of additive elements. The active materials used for the negative electrode 5 are preferably carbon compounds such as graphitizable carbon, non-graphitizable carbon, coke, polyacene and polyacethylene, or aromatic hydrocarbons containing acene structure such as pyrene or perylene. However, any material can be used as long as it can absorb and release lithium ions as a main component for battery operation. These active materials can be used in the form of particles having a size of 0.3 to 20 μm, and more preferably 0.3 to 0.5 μm.

As the binding resin used for electrode plating of an active material, any material can be used, which is not dissolved in an electrolyte and does not cause an electrochemical reaction inside the battery. Concretely, examples thereof are a homopolymer or a copolymer of vinylidene fluoride, ethylene fluoride, acrylonitrile, ethylene oxide and the like, and an ethylene propylene diamine rubber.

As the current collector, any stable compound causing no electrochemical reaction inside the battery can be used, aluminum and copper are preferably used for the positive electrode 3 and the negative electrode 5, respectively. Shape of the current collector can be a foil, a net, or an expanded metal, but the most preferable forms are a net or an expanded metal having a large area for space because it facilitates evaporation of the solvent after bonding.

Joining between the current collector and the active material layer is conducted by joining them with pressure under a high temperature.

The separator 4 can be made of any material with sufficient strength such as a porous film, a net, or an unwoven cloth having electronic insulation. There is no particular limitation for the material, but an individual porous film of polyethylene or polypropylene, or their laminated porous film are preferable from the viewpoint of adhesion and safety.

As a solvent and an electrolytic salt contained in the electrolyte used as the ion conductive member, the non-aqueous solvent and the lithium-containing electrolytic salt used for a conventional battery can be used. Concretely, a solvent or a mixed solvent containing two or more of an ether solvent such as dimethoxyethane, diethoxyethane, diethyl ether or dimethyl ether, and an ester solvent such as propylene carbonate, ethylene carbonate, diethyl carbonate or dimethyl carbonate can be used. Examples of the electrolytic salt for the electrolyte are $LiPF_6$, $LiAsF_6$, $LiClO_4$, $LiBF_6$, $LiCF_3SO_3$, $LiN(CF_3SO_2)_2$, $LiC(CF_3SO_2)_3$, $LiN(C_2F_5SO_2)_2$, $LiN(C_2F_5SO_2)(CF_3SO_2)$, $LiN(C_4F_9SO_2)(CF_3SO_2)$ and the like.

As a means to apply the adhesive resin solution, a bar coater, a screen printer, a spray gun are available.

Figure 2:
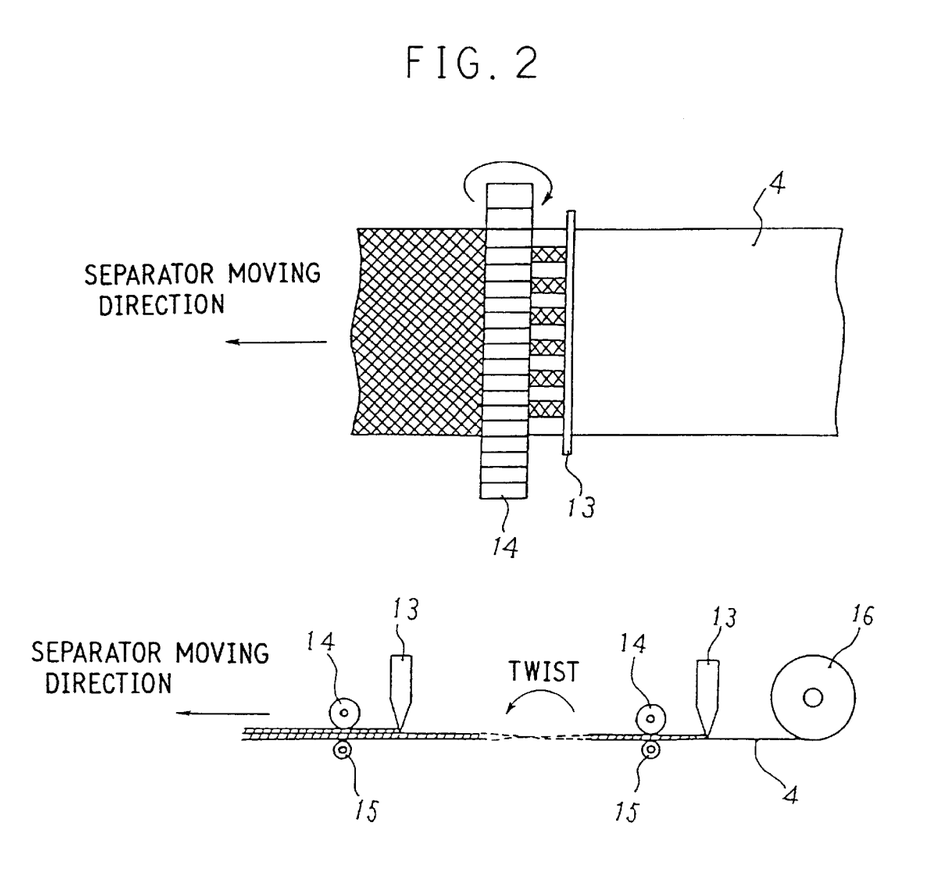
FIG. 2 is an illustration showing the method for applying an adhesive resin solution by a bar coating process in the embodiment of the present invention.

In a bar coater, as shown in FIG. 2, the adhesive resin solution is dropped in such a manner as to draw a line on the moving separator 4, then the dropped resin solution is rolled with the bar coater 14 to apply the adhesive resin evenly on the entire surface of one side of the separator 4. The separator 4 is then twisted 180 degrees to apply the resin solution on the other side in the same manner. According to the method, a large amount of the adhesive resin solution can be applied over the separator 4 within a short time. 13 is an adhesive resin supplying orifice, 15 is a supporting roll, 16 is a separator roll.

Figure 3:
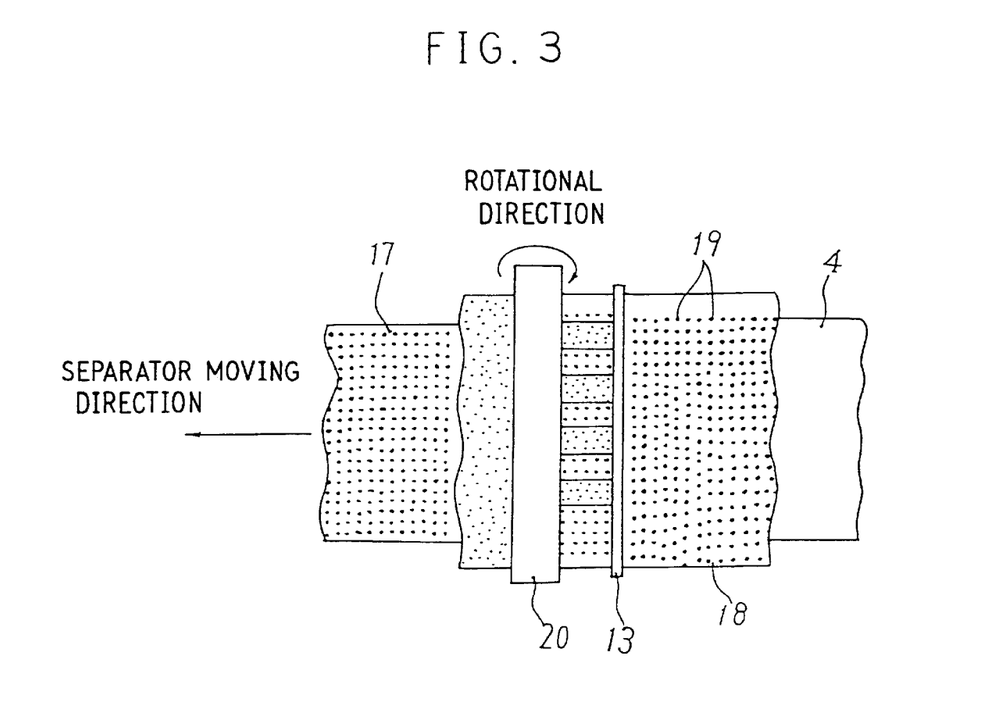
FIG. 3 is an illustration showing the method for applying an adhesive resin solution by a screen printing process in the embodiment of the present invention.

In the screen printer shown in FIG. 3, a screen having holes opened in dot, in line or in lattice and a roll are used. For example, the screen 18 having holes 19 in dot is placed near the surface of the separator 4, and the adhesive resin solution 17 is supplied through the adhesive resin supplying orifice onto the screen 18 arranged on the moving separator 4. The supplied adhesive resin is rolled with a roll 20, so that the pattern of the adhesive resin 17, on which the shapes of the holes 19 of the screen 18 are reflected, is transferred onto the separator 4. It becomes possible to apply the adhesive resin on both sides of the separator 4 in the form of dots by arranging at least two screen printers on both sides of the separator 4.

Figure 4:
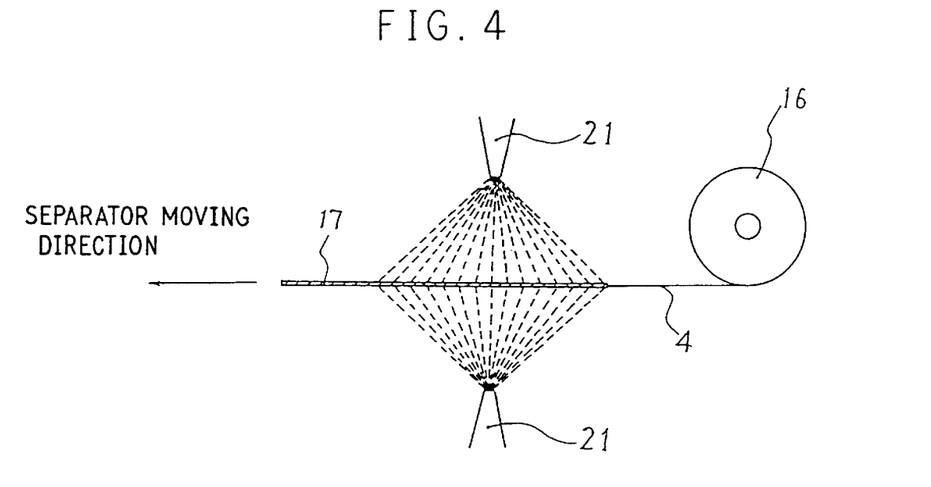
FIG. 4 is an illustration showing the method for applying an adhesive resin solution by using a spray gun in the embodiment of the present invention.

In a spray gun shown in FIG. 4, after the spray gun 21 is filled with the adhesive resin solution, the solution is sprayed over the separator 4. Consequently, the adhesive resin 17 adheres in the form of a thin film to the separator 4. It becomes possible to apply the adhesive resin on both sides of the separator 4 by arranging at least one spray gun 21 on each side of the separator 4 and continuously spraying of the adhesive resin solution while the separator 4 is moving.

Figure 6:
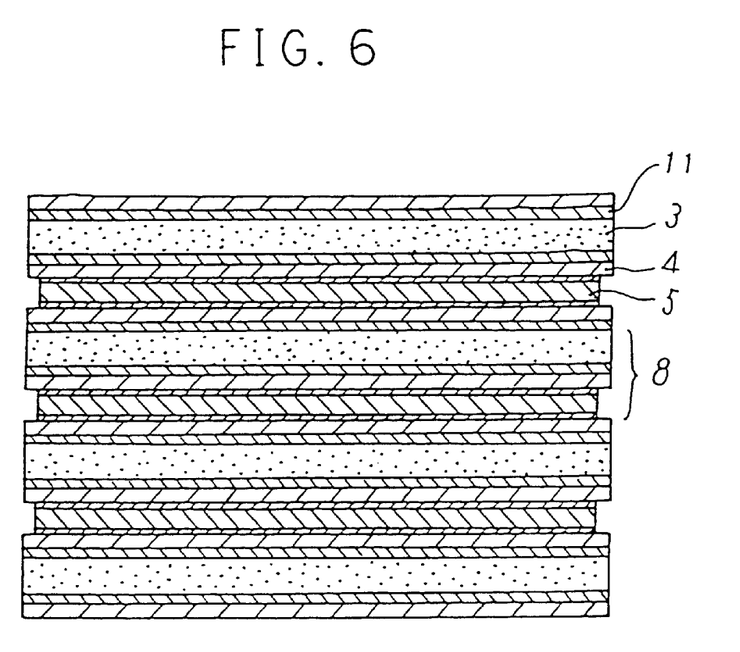
FIGS. 6, 7, and 8 are cross sectional views showing the battery structures of the lithium ion secondary battery of the other embodiment of the present invention.
Figure 7:
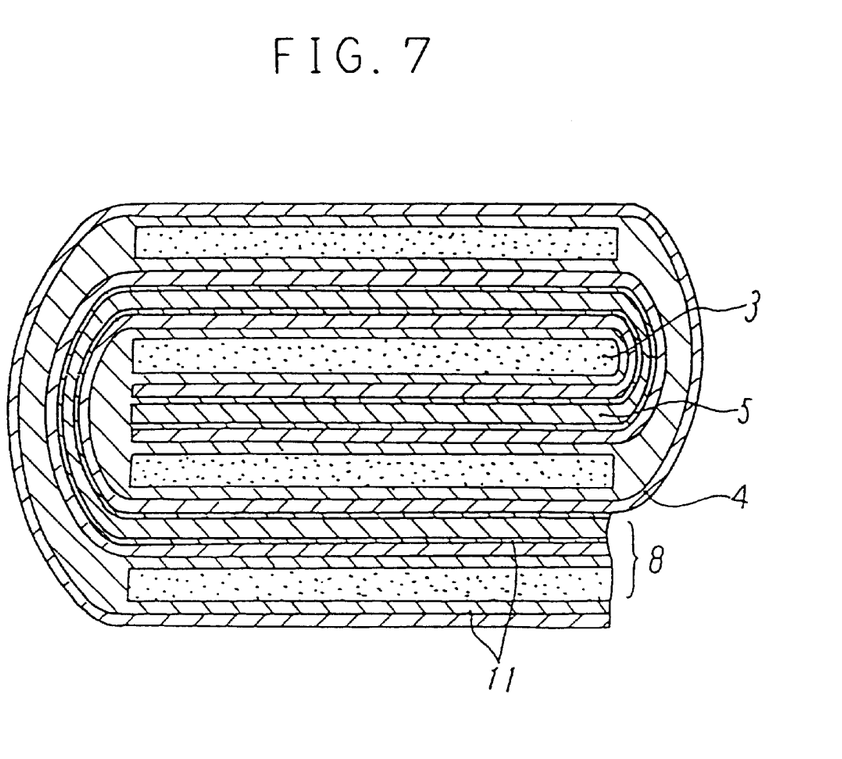
Figure 8:
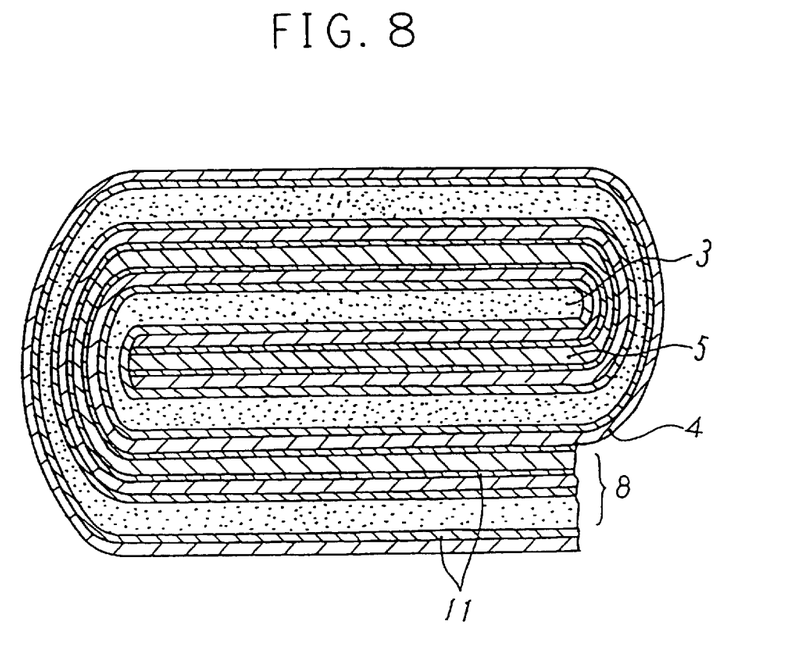

The above embodiment describes a single-layered electrode type battery, but it can be applied to a multi-layered electrode type battery having a plurality of electrode laminates, it becomes possible to obtain a compact and stable lithium ion secondary battery having a large battery capacity. Examples of the battery are shown in FIG. 6 wherein a structure having a multi-layered electrode laminate comprises the positive electrode 3 and the negative electrode 5 arranged alternately between the separated separators 4; and FIGS. 7 and 8 wherein a structure having a multi-layered electrode laminate comprises the positive electrode 3 and the negative electrode 5 arranged alternately between the coiled sheet-like separator 4. Furthermore, another unillustrated multi-layered electrode type battery comprising the positive electrode 3 and the negative electrode 5 arranged alternately between the folded sheet-like separator 4 can be obtained. The methods for manufacturing the multi-layered electrode type battery shown in FIGS. 6, 7, and 8 is described in detail in the following embodiments.

The present invention, which will be described in the following Examples, is not restricted to Examples.

EXAMPLE 1

Preparation of the positive electrode is described at first.

A positive electrode active material paste prepared by dispersing 87 parts by weight of $LiCoO_2$, 8 parts by weight of graphite powder, and 5 parts by weight of poly(vinylidene fluoride) into N-methyl pyrrolidone was applied as thick as 300 μm by a doctor blade process to form an active material thin film. An aluminum foil having 30 μm thickness forming the positive electrode current collector was arranged on the active material thin film, and the positive electrode active material paste having 300 μm thickness formed by a doctor blade process was applied again thereon. The lamination was left for 60 minutes in a drier at 60° C. to be half-dried. Then, the electrode laminates were slightly rolled with rollers having a distance of 550 μm therebetween and the lamination was tightly bonded each other to prepare the positive electrode. After the positive electrode was immersed in an electrolyte, the peeling strength between the positive electrode active material layer portion and the positive electrode current collector was measured to obtain a value of 20 to 25 gf/cm.

The preparation of the negative electrode is described next.

A negative electrode active material paste prepared by dispersing 95 parts by weight of mesophase micro bead carbon (available from Osaka Gas Co. Ltd.) and 5 parts by weight of poly(vinylidene fluoride) into N-methyl pyrrolidone (hereinafter referred to as "NMP") was applied as thick as 300 μm by a doctor blade process to form an active material thin film. A copper foil having 20 μm thickness forming the negative electrode current collector was arranged on the active material thin film, and the negative electrode active material paste having 300 μm thickness formed by a doctor blade process was applied again thereon. The lamination was left for 60 minutes in a drier at 60° C. to be half-dried. Then, the electrode laminates were slightly rolled with rollers having a distance of 550 μm therebetween to be tightly bonded each other. As a result, a negative electrode was formed. After the negative electrode was immersed in the electrolyte, the peeling strength between the negative electrode active material layer portion and the negative electrode current collector was measured to obtain a value of 10 to 15 gf/cm.

Preparation of an electrode laminate is described as follows.

First, poly(vinylidene fluoride) and NMP were mixed in a composition ratio of 5 parts by weight and 95 parts by weight respectively, and fully stirred to make a uniform solution until a viscous adhesive resin solution was obtained. Then, the adhesive resin solution prepared as described above was applied on both sides of a porous thin film comprising three layers of polyethylene/polypropylene/polyethylene adhered each other which was used as the separator. The application of the adhesive resin solution was conducted by the bar coating process shown in FIG. 2. The above-mentioned rolled separator 4 having a width of 12 cm and a thickness of 25 μm was removed, and the adhesive resin solution was added dropwise on one side of the separator 4 onto the line orthogonal to the direction of removing the separator. It became possible to apply the adhesive resin solution dropped on line on the entire surface of the separator 4 uniformly by rotating a bar coater 14 along with the transfer of the separator 4. The application amount of the adhesive resin was able to be controlled by changing the concentration and the dropping amount of the adhesive resin solution.

After the separator 4 applied by the adhesive resin solution was left for more than 15 seconds in a constant-temperature and constant-humidity space set at a temperature of 25° C. and a humidity of 60%, the positive electrode and the negative electrode were laminated each other with the separator arranged therebetween, and the electrode laminates were left in a warm air dryer for one hour at 80° C. to evaporate NMP and water to form an electrode laminate. Evaporation of NMP from the adhesive resin solution formed a porous adhesive resin layer having through holes penetrating the separator, the positive electrode, and the negative electrode.

Then, the electrode laminate was impregnated with an electrolyte containing ethylene carbonate and diethyl carbonate as a solvent and $LiPF_6$ as a solute. At this stage, the peeling strength between the negative electrode active material and the separator was measured to find that the strength was at least 20 gf/cm. The electrode laminates impregnated with the electrolyte was packed in an aluminum lamination film and thermally fused to seal the opening. As a result, a lithium ion secondary battery was completed.

Figure 5:
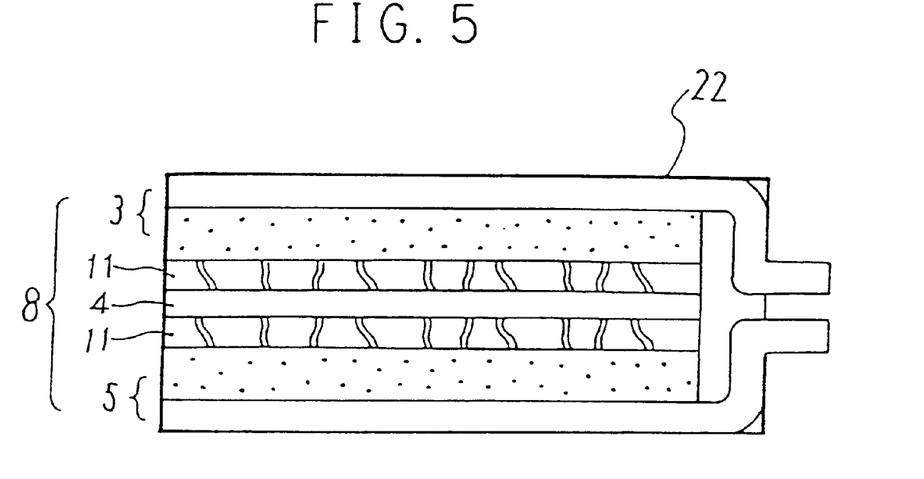
FIG. 5 is a cross sectional view showing the lithium ion secondary battery of the embodiment of the present invention.

FIG. 5 is a cross sectional view showing the lithium ion secondary battery obtained by the present invention. In the drawing, 22 is an aluminum laminate pack of the exterior and 8 is an electrode laminate sealed into the aluminum lamination film 22. The electrode laminate 8 comprises the positive electrode 3, the separator 4, the negative electrode 5, and the adhesive resin layers 11. The adhesive resin layers 11 are arranged between the positive electrode 3 and the separator 4, and between the negative electrode 5 and the separator 4, it bonds the positive electrode 3, the negative electrode 5, and the separator 4. The through holes 12 inside the adhesive resin layers 11 and the holes inside the electrode active material layer and the separator 4 are impregnated with the electrolyte.

As mentioned-above, in the lithium ion secondary battery, the adhesive resin layers 11 joins the positive electrode 3 with the separator 4, and also joins the negative electrode 5 with the separator 4. Furthermore, the adhesive resin layers 11 have a number of through holes 12 penetrating the electrodes 3, 5 and the separator 4. The through holes 12 impregnated with the electrolyte can secure excellent ion conductivity without external pressure. Consequently, it becomes possible to obtain a compact and light-in-weight secondary battery having excellent charge-discharge characteristics demanding no strong solid casing.

EXAMPLE 2

Table 1 shows the peeling strength between the negative electrode and the separator, when the humidity and leaving time of the application in Example 1 were changed in a range of 20% through 90%, and in a range of 15 seconds, 1 minute and 5 minutes, respectively.

TABLE 1

|  | 20% | 30% | 40% | 50% | 60% | 70% | 80% | 90% |
|---|---|---|---|---|---|---|---|---|
| 15 seconds | 0 | 0 | 6 | 21 | 27 | 36 | 40 | 48 |
| 1 minute | 0 | 0 | 20 | 24 | 31 | 36 | 42 | 45 |
| 5 minutes | 0 | 2 | 22 | 31 | 40 | 42 | 41 | 36 | unit: gf/cm

It was found out from Table 1 that the adjustment of humidity was effective to control of the peeling strength.

EXAMPLE 3

It was possible to join the electrodes with the separator with the same bonding strength of at least 20 gf/cm as in Example 1, even if the adhesive resin solution was applied onto the separator under the conditions of a temperature of 25° C. and the humidity of 30% in the same manner as in Example 1, then the separator applied with the resin solution was exposed in water vapor for at least one second. As a result, it became possible to obtain a compact and light-in-weight secondary battery having excellent charge-discharge characteristics demanding no strong solid casing.

EXAMPLE 4

It was possible to join the electrodes with the separator with the same bonding strength of at least 20 gf/cm as in Example 1, even if the adhesive resin solution was applied onto the separator under the conditions of a temperature of 25° C. and a humidity of 30% in the same manner as in Example 1, then the separator applied with the resin solution was exposed in ethanol vapor for at least one second. As a result, it became possible to obtain a compact and light-in-weight secondary battery having excellent charge-discharge characteristics demanding no strong solid casing,

EXAMPLE 5

It was possible to join the electrodes with the separator at the same bonding strength of 20 at least gf/cm as in Example 1, even if the separator applied with the adhesive resin solution was exposed for at least one second to vapor of methanol, propanol, hexane, pentane, cyclohexane, ethylene carbonate, propylene carbonate, dimethyl carbonate, diethyl carbonate, or dimethoxyethane instead of water vapor or ethanol vapor shown in Examples 3 and 4, respectively. As a result, it became possible to obtain a compact and light-in-weight secondary battery having excellent charge-discharge characteristics demanding no strong solid casing.

EXAMPLE 6

In preparation of the adhesive resin solution, NMP was mixed in the same composition ratio with poly (tetrafluoroethylene), a copolymer of vinylidene fluoride and acrylonitrile, a mixture of poly(vinylidene fluoride) and polyacrylonitrile, a mixture of poly(vinylidene fluoride) and poly(ethylene oxide), a mixture of poly(vinylidene fluoride) and poly(ethylene terephthalate), a mixture of poly (vinylidene fluoride) and poly(methyl methacrylate), a mixture of poly(vinylidene fluoride) and polypropylene, or a mixture of poly(vinylidene fluoride) and polyethylene respectively, instead of poly(vinylidene fluoride). As a result, a viscous adhesive resin was obtained.

By using a solution dissolved or dispersed with these adhesive resin in NMP, the electrode laminate 8 was prepared in the same manner as in Examples 1 to 5. In the electrode laminate 8, the peeling strength between the negative electrode active material layer and the separator was measured to find that it was at least 20 gf/cm. An electrolyte was held in the same manner as in Example 1 or 2 and packed with an aluminum laminate film, and its opening was sealed. As a result, a lithium ion secondary battery was prepared. Similar to Example 1 or 4, it was possible to obtain the battery, which was a compact and light-in-weight secondary battery having excellent charge-discharge characteristics.

EXAMPLE 7

In preparation of the adhesive resin solution, a viscous adhesive resin solution was obtained by dissolving or mixing poly(vinyl alcohol), a mixture of poly(vinyl alcohol) and poly(vinylidene fluoride), a mixture of poly(vinyl alcohol) and polyacrylonitrile, and a mixture of poly(vinyl alcohol) and poly(ethylene oxide), into or with NMP, instead of poly(vinylidene fluoride).

By using these adhesive resin solutions, the electorde laminate 8 was prepared in the same manner as in Examples 1 to 5. In the electrode laminate 8, peeling strength between the negative electrode active material layer and the separator was measured to find that it was at least 20 gf/cm. An electrolyte was held in the same manner as in Example 1 or 2 and packed with an aluminum laminate film, and its opening was sealed. As a result, a lithium ion secondary battery was prepared. Similar to Example 1 or 4, it was possible to obtain the battery, which was a compact and light-in-weight secondary battery having excellent charge-discharge characteristics.

EXAMPLE 8

It was possible to join the electrodes with the separator at the same bonding strength of at least 20 gf/cm as in Example 1, even if the adhesive resin solution containing poly(vinyl alcohol) in Example 7 was applied onto the separator under the conditions of a temperature of 25° C. and a humidity of 30% in the same manner as in Example 1, then the separator applied with the resin solution was exposed in hexane vapor for at least one second. Furthermore, an electrolyte was held in the same manner as in Example 1 or 2 and packed with an aluminum laminate film, and its opening was sealed. As a result, a lithium ion secondary battery was prepared. Similar to Example 1 or 4, it was possible to obtain the battery, which was a compact and light-in-weight secondary battery having excellent charge-discharge characteristics.

EXAMPLE 9

As shown in FIG. 3, the rolled porous sheet comprising three layers of polyethylene/polypropylene/polyethylene having a width of 12 cm and a thickness of 25 $\mu$m was removed, which was used as the separator 4, and a screen 18 having holes 19 opened in dot having 100 $\mu$m diameter was pressed to the separator 4. The adhesive resin was possibly applied in dot over the separator by supplying the adhesive resin solution shown in Example 1 onto the screen 18, and by rolling the adhesive resin on the screen by using an application roller 20. The separator was twisted 180 degrees and the adhesive resin was applied on the other side, wherein the resin was not applied. It became possible that the adhesive resin 17 was applied on both sides thereof In that manner, the separator 4 applied with the adhesive resin layer was left for at least 15 seconds in a constant-temperature and constant-humidity space set at a temperature of 25° C. and a humidity of 60%, then the electrodes were laminated, and subjected to aluminum lamination, to obtain a lithium ion secondary battery having excellent properties similar to the battery shown in Example 1. Even if the same vapor exposure treatment as in Examples 3 to 5 was conducted, a lithium ion secondary battery having the same excellent properties as the battery shown in Example 1 was obtained.

EXAMPLE 10

As shown in FIG. 4, the rolled porous sheet comprising three layers of polyethylene/polypropylene/polyethylene having a width of 12 cm and a thickness of 25 $\mu$m was removed, and the adhesive resin solution was sprayed on the separator 4 by using a spray gun 21 filled with the adhesive resin solution. By spraying, the solution could be evenly applied on both sides of the separator 4. An amount of application of the solution could be adjusted by changing spraying speed. The separator 4 applied with the adhesive resin layer was left for at least 15 seconds in a constant-temperature and constant-humidity space set at a temperature of 25° C. and a humidity of 60%, then the electrodes were laminated, and subjected to aluminum lamination, to obtain a lithium ion secondary battery having the same excellent properties as the battery shown in Example 1. Even if the same vapor exposure treatment as in Examples 3 to 5 was conducted, a lithium ion secondary battery was obtained, which had the same excellent properties as the battery shown in Example 1.

EXAMPLE 11

The present Example shows a method for preparing a lithium ion secondary battery having a battery body of a flat lamination structure shown in FIG. 6.

The positive and negative electrodes shown in Example 1 and the adhesive resin solution shown in Examples 1, 6, and 7 were used. Application of the adhesive resin solution was conducted by a bar coating process shown in Example 1. After the adhesive resin solution was applied, prior to laminating the electrodes, they were left in a constant-temperature constant-humidity space as shown in Examples 1 to 2.

The adhesive resin solution was applied on one side of the two separators comprising a porous thin film, wherein three layers of polyethylene/polypropylene/polyethylene were adhered. Then, the positive electrode (or negative electrode) was sandwiched between the separators, laminated, and dried at 80° C.

The separators having the positive electrode (or the negative electrode) therebetween were stamped into a pre-determined size. The adhesive resin solution was applied on one side of the stamped separators, and left in a constant-temperature and constant-humidity space. Then the negative electrode (or the positive electrode) stamped into the pre-determined size was laminated therewith. Then, the adhesive resin solution was applied on one side of the other separators stamped into the pre-determined size, and the separator was left in a constant-temperature and constant-humidity space. Applied surface of the other separator was laminated with the surface of the positive electrode (or negative electrode) laminated before. The process was repeated to form a battery body having a plurality of electrode laminates, and the battery body was dried while being pressed to prepare the battery body of the flat multi-layered structure as shown in FIG. 6.

The current collecting tabs connected to the respective ends of the positive electrode and the negative electrode of the battery body of a flat multi-layered structure were spot-welded between the positive electrodes and between the negative electrodes, to connect the battery body electrically in parallel.

After being immersed in an electrolyte containing $LiPF_6$ having a concentration of 1.0 mol/dm$^3$ dissolved in a mixed solvent of ethylene carbonate and dimethyl carbonate (1:1 in molar ratio), the battery body of a flat multi-layered structure was sealed in a bag made of an aluminum laminate film with thermal fusion to complete a lithium ion secondary battery having a battery body of a flat type multi-layered structure.

EXAMPLE 12

The present Example describes a method for manufacturing a lithium ion secondary battery having a battery body of a flatly coiled multi-layered structure shown in FIG. 7.

The positive and negative electrodes shown in Example 1 and the adhesive resin solution shown in Examples 1, 6, and 7 were used. The application of the adhesive resin solution was conducted by a bar coating process shown in Example 1. After the adhesive resin solution was applied, prior to laminating of the electrodes, they were exposed in a constant-temperature and constant-humidity space as shown in Examples 1 and 2.

After an adhesive resin solution was applied on each one side of the two sheet-like separators each made of a porous thin film, wherein three layers of polyethylene/polypropylene/polyethylene were adhered each other, a sheet-like negative electrode (or the positive electrode) was sandwiched between each of the sides applied with the adhesive resin solution and tightly adhered, and put in a warm air drier for 2 hours at 80° C. to evaporate the solvent.

The adhesive resin solution was applied on one side of the sheet-like separators having the negative electrode (or the positive electrode) therebetween, and the separators were left in a constant-temperature and constant-humidity space. Then, one end of the separators was folded to a fixed amount to sandwich the positive electrode (or the negative electrode) therebetween, and was passed through a laminator. Then, the adhesive resin solution was applied on the other side of the sheet-like separators and the separators were left in a constant-temperature and constant-humidity space. Another positive electrode (or the negative electrode) was laminated to the position opposite the positive electrode (or the negative electrode) sandwiched before between the separators. The separators were coiled to form an oval, and the process of coiling the separators was repeated while laminating a further another positive electrode (or negative electrode) therebetween, thereby forming a battery body having a multi-layered electrode lamination. The battery body was dried with pressing to form a battery body of a flatly coiled multi-layered structure.

The current collecting tabs connected to the respective ends of the positive electrode and the negative electrode of the battery body of a flat multi-layered structure were spot-welded between the positive electrodes and between the negative electrodes, to connect the battery body electrically in parallel.

After being immersed in an electrolyte containing $LiPF_6$ having a concentration of 1.0 mol/dm$^3$ dissolved in a mixed solvent of ethylene carbonate and dimethyl carbonate (1:1 in molar ratio), the battery body of a flatly coiled multi-layered structure was sealed in a bag made of an aluminum laminate film with thermal fusion to prepare a lithium ion secondary battery having a battery body of a flatly coiled multi-layered structure.

The present Example shows to coil the separators; alternatively, sheet-like separators having a negative electrode (or a positive electrode) joined therebetween can be folded, and the process of folding the separators may be repeated while laminating a positive electrode (or a negative electrode) therebetween.

EXAMPLE 13

The present example describes a method of preparing a lithium ion secondary battery having a battery body of a flatly coiled type multi-layered structure shown in FIG. 8. Unlike the method shown in Example 12, the electrodes and the separator are coiled at the same time.

The positive and negative electrodes shown in Example 1 and the adhesive resin solution shown in Examples 1, 6, and 7 were used. The application of the adhesive resin solution was conducted by the bar coating process shown in Example 1. After the adhesive resin solution was applied, prior to laminating the electrodes, they were left in a constant-temperature and constant-humidity space as shown in Examples 1 and 2.

A sheet-like negative electrode (or positive electrode) was arranged between two sheet-like separators 3 made of a porous thin film comprising three layers of polyethylene/polypropylene/polyethylene and a sheet-like positive electrode (or a negative electrode) was disposed outside one of the separators to be protruded in a fixed amount. An adhesive resin solution was applied over the inner side of each separator and the outside surface of the separators wherein the positive electrode (or the negative electrode) was disposed. After they were left in a constant-temperature and constant humidity space, the positive electrode (or the negative electrode), the two separators, and the negative electrode (or the positive electrode) were combined together and passed through a laminator. After the adhesive resin solution was applied over the outside surface of the other separator, the separators were left in a constant-temperature and constant humidity space, and the protruded positive electrode (or negative electrode) was folded towards the surface is having the solution thereon to be laminated. The laminated separators were coiled to form an oval in such a manner as to wrap the folded positive electrode (or the negative electrode), thereby forming a battery body having multi-layered electrode lamination. The battery body was dried with pressing to prepare a battery body with the flatly coiled type multi-layered electrode lamination.

The current collecting tabs connected to the respective ends of the positive electrode and the negative electrode of the battery body of a flat type multi-layered structure were spot-welded between the positive electrodes and between the negative electrodes to connect the battery body electrically in parallel.

After being immersed in an electrolyte containing $LiPF_6$ having a concentration of 1.0 mol/dm$^3$ dissolved in a mixed solvent of ethylene carbonate and dimethyl carbonate (1:1 in molar ratio), the battery body of a flat type multi-layered structure was sealed in a bag made of an aluminum laminate film with thermal fusion to prepare a lithium ion secondary battery having a battery body of a flatly coiled type multi-layered structure.

The second solvent was supplied by introducing the separators applied with the adhesive resin solution to a constant-temperature and constant humidity space or a space filled with vapor of the second solvent in the above-mentioned Examples; alternatively, the second solvent can be sprayed by using a sprayer.

INDUSTRIAL APPLICABILITY

The secondary battery of the present invention is used for portable electronic appliances such as a portable personal computer and a cellular phone, and it realizes downsizing, weight reduction, and desirable shape of the appliances with an improvement in battery performance.

What is claimed is:

1. A method for manufacturing a lithium ion secondary battery, comprising the steps of:

a) preparing a positive electrode obtained by joining a positive electrode active material layer with a positive electrode current collector, a negative electrode obtained by joining a negative electrode active material layer with a negative electrode current collector, and a separator arranged between the positive electrode and the negative electrode; and b) applying an adhesive resin solution to the separator, wherein the adhesive resin is dissolved in a first solvent, and then supplying a second solvent which is different from the first solvent to the applied adhesive resin solution, and forming an electrode laminate by laminating the positive electrode and the negative electrode to the separator, wherein the second solvent is supplied by introducing the separator applied with the adhesive resin solution to a space containing vapor of the second solvent.

2. The method of claim 1, wherein the second solvent is a material soluble in the first solvent and having a lower solubility for the adhesive resin than the first solvent.

3. The method of claim 1, wherein the adhesive resin is a fluororesin or a mixture comprising a fluororesin as a main component.

4. The method of claim 3, wherein the fluororesin is a polymer or a copolymer of vinylidene fluoride.

5. The method of claim 1, wherein the adhesive resin is poly(vinylalcohol) or a mixture comprising poly(vinylalcohol) as a main component.

6. The method of claim 1, further comprising a step of forming a structure wherein a plurality of electrode laminates are stacked.

7. The method of claim 1, wherein a bonding strength between the positive electrode active material layer and the separator is equal to or greater than that between the positive electrode active material layer and the positive electrode current collector.

8. The method of claim 1, wherein a bonding strength between the negative electrode active material layer and the separator is equal to or greater than that between the negative electrode active material layer and the negative electrode current collector.

9. The method of claim 1, wherein the first solvent is N-methylpyrrolidone, N,N'-dimethylformnamide or dimethylsulfoxide.

10. The method of claim 9, wherein the first solvent is N-methylpyrrolidone.

11. The method of claim 1, wherein the second solvent decreases adhesive resin fluidity in a vicinity of an air interface in forming an adhesive resin layer, wherein the adhesive resin is less soluble therein than in said first solvent.

12. The method of claim 11, wherein said second solvent is a lower alkyl alcohol, hydrocarbon or water.

13. The method of claim 12, wherein said second solvent is a lower alkyl alcohol which is methanol or ethanol.

14. The method of claim 12, wherein said second solvent is water.

15. The method of claim 1, wherein the positive electrode active material layer comprises a composite oxide comprising lithium and a transition metal, a chalcogen compound or a material containing these composite oxides.

16. The method of claim 1, wherein the negative electrode active material layer comprises graphitizable carbon, non-graphitizable carbon, coke, polyacetylene, pyrene or perylene.

17. The method of claim 1, wherein the lithium ion secondary battery is held together without a solid casing.

* * * * *

UNITED STATES PATENT AND TRADEMARK OFFICE
CERTIFICATE OF CORRECTION

PATENT NO. : 6,692,543 B1
DATED : February 17, 2004
INVENTOR(S) : Hamano et al.

It is certified that error appears in the above-identified patent and that said Letters Patent is hereby corrected as shown below:

Title page,
Item [86], should read:
-- [86]  PCT No.:        PCT/JP97/04666

§ 371 (c)(1),
(2), (4) Date:   Jun. 19, 2000 --

Signed and Sealed this

Twentieth Day of April, 2004

JON W. DUDAS
*Acting Director of the United States Patent and Trademark Office*